Dec. 28, 1954     P. MÜLLER     2,697,951

METHOD FOR MAKING SAFETY RAZOR BLADES

Filed March 6, 1951     2 Sheets-Sheet 1

INVENTOR
Paul Müller
By: Haseltine, Lake & Co.
AGENTS

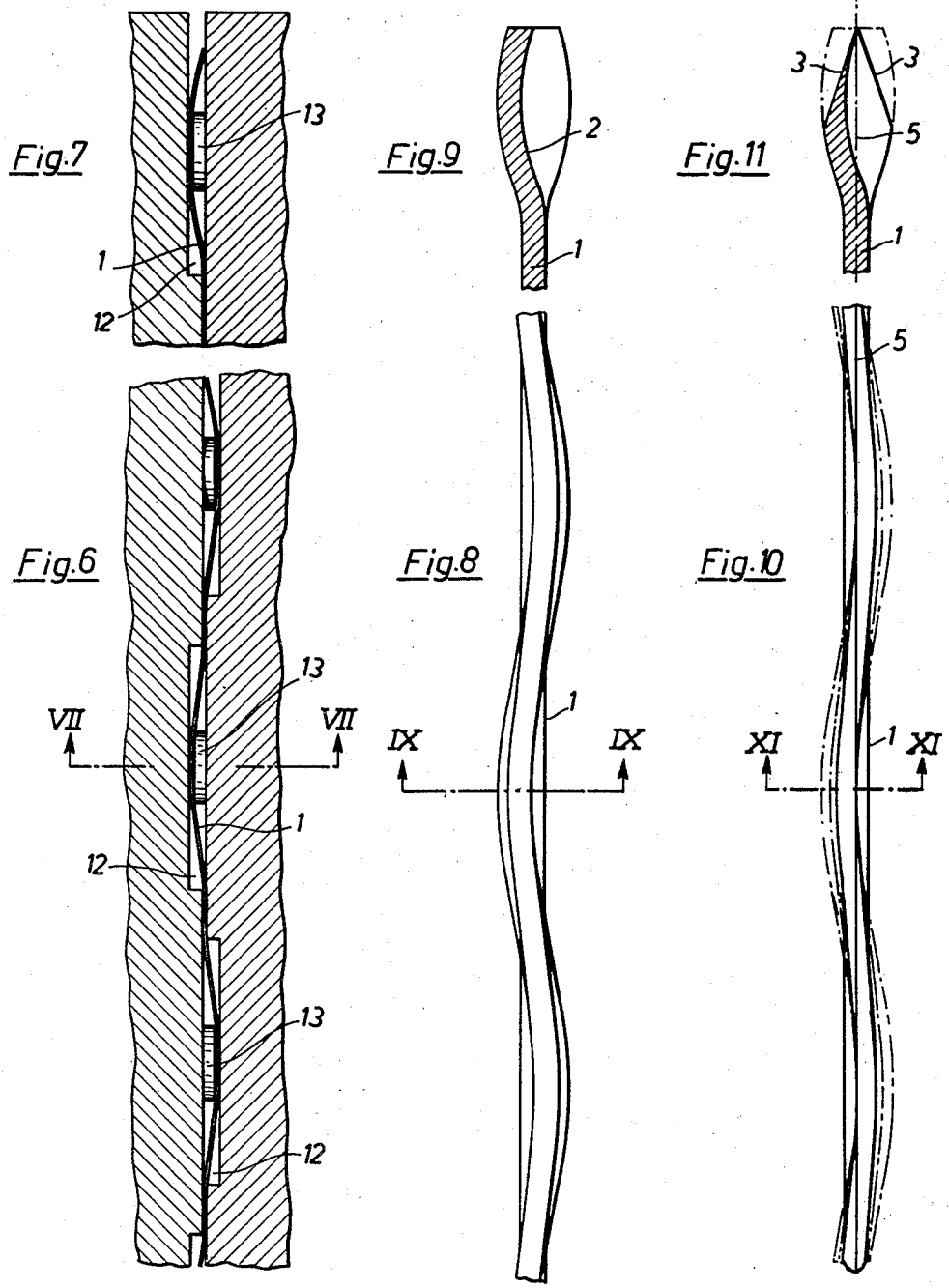

United States Patent Office 2,697,951
Patented Dec. 28, 1954

2,697,951

METHOD FOR MAKING SAFETY RAZOR BLADES

Paul Müller, Solingen, Germany

Application March 6, 1951, Serial No. 214,050

Claims priority, application Germany October 7, 1950

2 Claims. (Cl. 76—104)

Knife blades have been made with rounded hollows meeting the blade edge, the hollows being either spaced or next each other on one face of the blade, or disposed alternately on the two sides of the blade; they may shallow towards the edge of the blade. They have the advantage of making the blade extra sharp at intervals along its length.

It has been proposed to provide analogous hollows in the edge of safety razor blades. But whereas a knife is thick and hollows of substantial width can be ground in it, for a razor blade they must be much smaller, and to grind them is not practicable on account of the thinness of the blade. The present invention relates principally to a form of razor blade made with such hollows, giving much the effect of a hollow ground blade, while avoiding the fragility which would result if an attempt were made to hollow grind the blade throughout its length. This blade has spaced thinned spots adjacent to at least one of its straight edges, bounded on the one side by the ground surface of the edge and on the other by the unground surface of a hollow in the face of the blade. The invention also includes a method of making such blades. The method is to form hollows in the band of steel from which the blades are to be made before the edges are sharpened. They may be on one face only of the band or alternately in the two faces.

Figure 1:
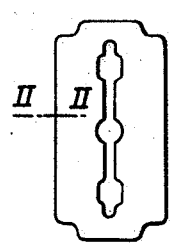
Figure 2:
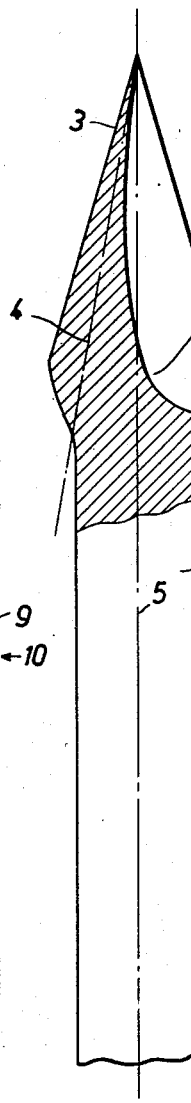
Figure 3:
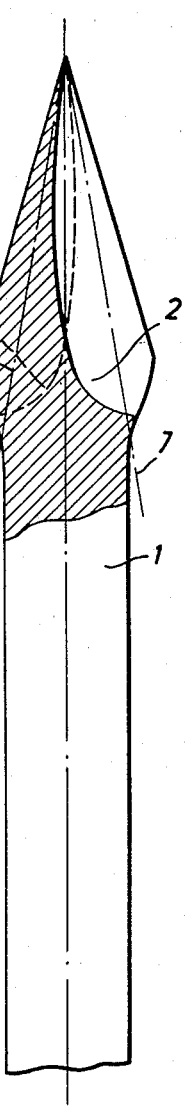
Figure 4:
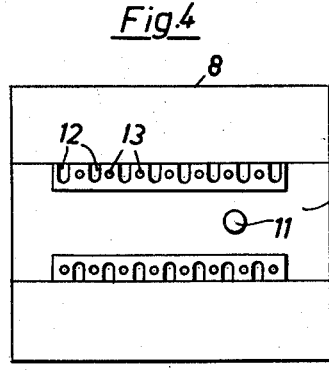
Figure 5:

Both the form of blade and the way in which it is made are illustrated in the accompanying drawings, in which Fig. 1 shows the outline of a typical blade of the kind to which the invention relates, Fig. 2 is a much enlarged fragmentary section on such a line as II—II of Fig. 1 of a blade having recesses in one face only, Fig. 3 is a similar view of a blade having recesses in both faces, Fig. 4 is a plan and Fig. 5 an elevation of a die used in the making of a blade according to the invention, Fig. 6 is a fragmentary enlarged lengthwise section of the press tool consisting of die and counterpart each as shown in Figs. 4 and 5, showing a strip of blade material corrugated by the tool, Fig. 7 is a cross-section on the line VII—VII of Fig. 6, Fig. 8 is an edge elevation on the same enlarged scale of a length of deformed blade material after subjection to a further process step (in which for sake of clearness the thickness of the blade is exaggerated), Fig. 9 is a cross section on the line IX—IX of Fig. 8, Fig. 10 is a view generally similar to Fig. 9 and Fig. 11 is a cross-section on the line XI—XI of Fig. 10 and they show in dot-dash lines the form of the corrugated strip prior to grinding.

Fig. 1 needs no further description. Fig. 2 shows the form of a blade edge in section at the middle of one of the hollows 2 in its face. Its ground surface is indicated at 3. At this point and its neighbourhood the blade presents in cross-section the appearance of a hollow ground blade. Also it has the advantage of a hollow ground blade. Its edge is sharper at the hollows than elsewhere, that is to say there is a less angle between the two surfaces of the blade at the recess than elsewhere. For the same reason it will remain sharp longer. It will be seen that the bisector of the angle between the two surfaces of the blade is inclined to the mid plane 5 and the flat faces of the blade while where there are no hollows the bisector would coincide with the mid plane of the blade. Such a form of blade can engage the hair close to the skin, and in effect cuts upward away from the skin, that is to say in the direction of the mid line 4. To attempt such hollow grinding of the whole length of the blade would make the edge so thin and flexible and mechanically weak as to be useless. The hollow ground form of the blade of Fig. 2 being confined to short spaced lengths these are sufficiently stiffened by the intervening non-recessed length.

If the hollows 2 are made of different depths the inclination of the mid line to the blade surface will be different in different hollows.

As a rule it will be preferable to form hollows on both sides of the blade, those on one side being staggered with respect to those on the other. A construction of this kind is shown in Figure 3 and its manufacture is described with reference to subsequent figures. The hollows 6 give rise to short lengths of blade which are of hollow ground form but have the blade mid line 7 oppositely inclined from the mid line 4 to the mid plane of the blade.

The blades are made from a continuous tape or band of steel of a width and thickness equal to the desired width and thickness of blade; the tape is first passed through a punching machine which makes in it the usual locating apertures of the blade, as shown, for instance in Fig. 1. The machine also forms transverse grooves across the tape at intervals equal to the desired length of the blade; these constitute lines of weakness at which the tape may later be broken into separate blades. The tape is fed through this punching machine step by step, the steps being of the length of a blade. Next the tape is passed step by step between a die and counterpart both of which are of the form shown in Figs. 4 and 5. These may be incorporated in the same machine as makes the locating perforations. The tape is fed along the track 9 formed in the press-tools in the direction of the arrow 10 in Fig. 4. It rides over a locating pin 11 in the die which has a bevelled top surface and which engages in a locating aperture in the blade material, for instance in the centre opening shown in Fig. 1, entering a corresponding recess in the counterpart die when the press tools are brought together. They are shown brought together in Figs. 6 and 7. In each die are recesses 12 of U outline, and between them round projecting studs 13: and as appears from Fig. 6 the studs of the one die are opposite the recesses of the other. The recesses 12 in the die extend to the edge of the blade material; the studs 13 are set in a little from the edge. The result of bringing the tools together is to corrugate each edge of the tape as seen in Figs. 6, 7 and 9. For greater precision in manufacture the tape may be corrugated by the press tools somewhat more deeply than is necessary, and the depth of the corrugations is subsequently reduced by passing the corrugated tape between press rollers. The effect of this step in the manufacture is seen in Fig. 8. After this the tape is hardened and tempered and broken into separate blades, which have then to be sharpened.

As may be seen from Figs. 8, 9, 10 and 11 the extent of corrugation in these figures has been adjusted so that the concave surface of the corrugations at the edge of the blade is tangential to the mid plane 5 of the blade. The blade is now ground to the lines 3 in Fig. 11 producing the form of blade seen in Figs. 3, 10 and 11. The plane of grinding intersects the concave surface of the corrugations at the edge of the blade, leaving the blade edge straight.

The form of tool shown in Fig. 6 produces corrugations all of the same depth. It will be clear that by making the studs 13 of different depth and the recesses 12 of different width some corrugations may be made deeper and more extensive than others.

What I claim is:

1. A method for making safety razor blades, comprising the steps of forming transverse grooves across a steel tape, said transverse grooves having a distance from one another substantially equalling the length of a blade and constituting lines of weakness at which said tape is eventually broken into separate blades; pressing corrugations in at least one edge portion of said tape, said corrugations being separated from one another in the longitudinal direction of said tape and having concave surfaces being at the edge of said tape tangential to the mid plane of said tape so as to leave the edge of said tape straight; hardening said tape so as to obtain a hardened tape; tempering said hardened tape so as to obtain a tempered tape; breaking said tempered tape along said transverse grooves into separate blades; and grinding said separate blades in planes intersecting said concave surfaces of said corrugations at the straight edge of said tape so as to obtain a sharpened blade.

2. A method for making safety razor blades, comprising the steps of forming transverse grooves across a steel tape, said transverse grooves having a distance from one another substantially equalling the length of a blade and constituting lines of weakness at which said tape is eventually broken into separate blades; pressing corrugations in at least one edge portion of said tape, said corrugations being separated from one another in the longitudinal direction of said tape and having concave surfaces being at the edge of said tape tangential to the mid plane of said tape so as to leave the edge of said tape straight; reducing the depth of said corrugations of said tape; hardening said tape so as to obtain a hardened tape; tempering said hardened tape so as to obtain a tempered tape; breaking said tempered tape along said transverse grooves into separate blades; and grinding said separate blades in planes intersecting said concave surfaces of said corrugations at the straight edge of said tape so as to obtain a sharpened blade.

References Cited in the file of this patent

UNITED STATES PATENTS

| Number | Name | Date |
|---|---|---|
| 352,409 | Harris | Nov. 8, 1886 |
| 1,165,037 | Tarbox | Dec. 21, 1915 |
| 1,202,611 | Tolputt | Oct. 24, 1916 |
| 1,227,234 | Bacon | May 22, 1917 |
| 1,499,698 | Shoenert | July 1, 1924 |
| 1,542,892 | Koenig | June 23, 1925 |
| 1,579,577 | Thompson | Apr. 6, 1926 |
| 1,728,192 | Wellington | Sept. 17, 1929 |
| 1,827,872 | Frost | Oct. 20, 1931 |
| 1,895,763 | Lubbertsmeier | Jan. 31, 1933 |
| 1,911,974 | Shelton | May 30, 1933 |
| 1,942,025 | Frost | Jan. 2, 1934 |
| 2,002,812 | Hansen | May 28, 1935 |
| 2,112,271 | Dalkowitz | Mar. 29, 1938 |
| 2,184,150 | Parker | Dec. 19, 1939 |
| 2,409,604 | Young | Oct. 15, 1946 |
| 2,569,054 | Herzog | Sept. 25, 1951 |